(No Model.)

O. KOHLRAUSCH.
APPARATUS FOR EXTRACTING TANNIC ACID.

No. 259,555. Patented June 13, 1882.

Witnesses
Will P. Omohundro
Jas. A. Baxter.

Inventor
Dr. Otto Kohlrausch
By Myers & Co. Attys

UNITED STATES PATENT OFFICE.

OTTO KOHLRAUSCH, OF VIENNA, AUSTRIA-HUNGARY.

APPARATUS FOR EXTRACTING TANNIC ACID.

SPECIFICATION forming part of Letters Patent No. 259,555, dated June 13, 1882.

Application filed February 20, 1882. (No model.) Patented in Austria August 6, 1879, No. 18,879; in Hungary August 6, 1879, No. 2,099; in England February 13, 1880, No. 627; in France April 2, 1880, No. 134 979; in Belgium June 30, 1880, No. 51,756; in Luxemburg January 5, 1881, No. 104; in Germany January 22, 1881, No. 12,296, and in Italy March 8, 1881, 15, 12,663, XXV, 219.

*To all whom it may concern:*

Be it known that I, Doctor OTTO KOHLRAUSCH, a subject of the Emperor of Austria-Hungary, residing at Vienna, Austria-Hungary, have invented certain new and useful improvements in apparatus for and processes of extracting tannic acid and dye-wood extracts or pigments from bark, dye and other woods, and plants by means of diffusion; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figures 1, 3:
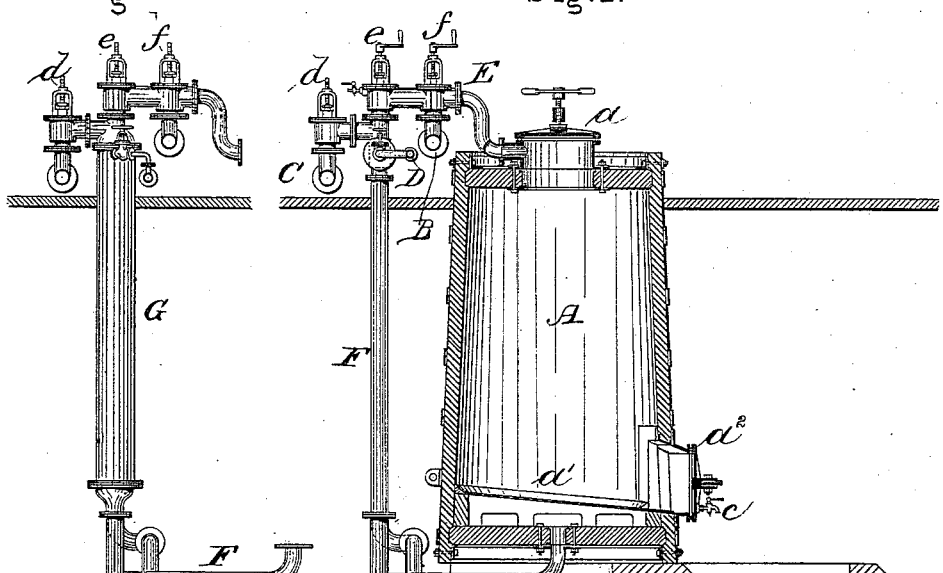
Figure 4:
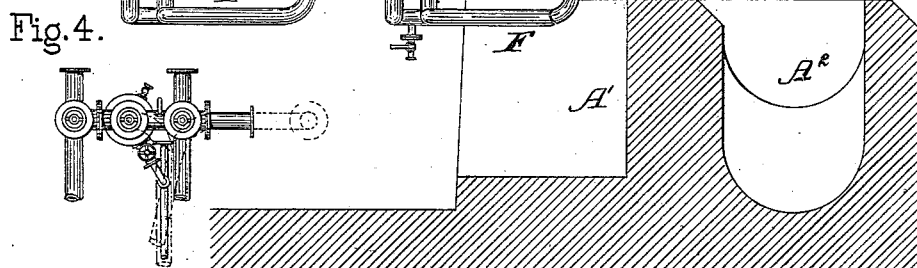
Figure 2:
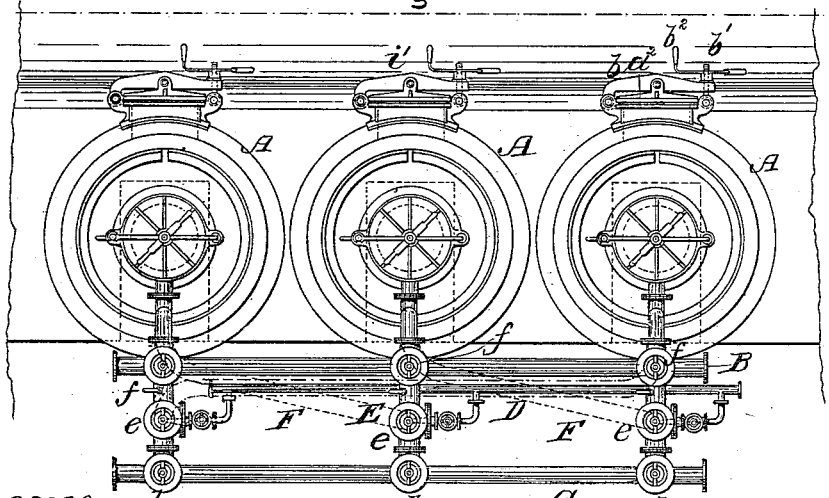

Figure 1 is a vertical section of my improved apparatus. Fig. 2 is a plan or top view thereof. Fig. 3 is a detailed section, and Fig. 4 is a detail plan of the same.

My invention relates to an improved apparatus and process for extracting tannic acid and dye-wood extracts or pigments from bark, dye and other woods, and plants by means of diffusion.

I employ barks, wood, or other suitable vegetable matter containing tannic acid or pigments, and the process of diffusion, in connection with a suitable battery of extractors.

The materials (which are treated in hermetically-closed vessels) are not rasped, but simply comminuted by suitable machinery into pieces of varying sizes, as follows: one to eight centimeters in length, one to four centimeters in breadth, and 0.1—1 centimeter in thickness. These are then placed in a battery of vessels more or less numerous, constructed of any material not liable to be affected by the action of tannic acid—as copper, wood, enameled iron, &c.—and which will be described in connection with my improved apparatus hereinafter. The prepared material is then subjected to diffusion, water being caused to flow under pressure into the first vessel containing the material at a temperature of from 20° to 75° Celsius.

By this process the tannic acid and pigments which are dissolved in the cell-juice pass through the permeable membrane of the vegetable cells into the surrounding water. This mode of diffusion is continued until the solution is equally as strong within as without the cells. When this condition is reached the liquid is caused to pass through connecting pipes or conduits adjustably connected with calorifiants, and from the first into the second vessel, and thus *seriatim* through the series, save the last one, fresh water meanwhile being introduced into the first vessel. After equalization of the diffusion this process is repeated, the liquid being caused to pass through successive vessels, and meanwhile fresh portions of water enter the first vessel. Between each two vessels or receptacles there is applied a calorifere or closed steam heating apparatus, from which is caused to flow a direct steam-injection, whereby the liquids are maintained at a constant and uniform temperature of from 20° to 75° Celsius. This process is repeated in each vessel of the series but the last one, without regard to the number thereof. The extracts thus become more and more perfect as concentrated, and are thus caused to leave the battery in a state of concentration nearly equal to the concentrated state of the tannic acid and pigments in the raw material. The vessels are so arranged with relation to each other and to the calorifere and pipe connections as to permit the operations being conducted continuously during the gradual process of perfecting the product. The extract is then inspissated in vacuum-pans to a state of concentration, as desirable for the market; but it may be employed in the manufacture of leather without being inspissated.

Referring to the accompanying drawings, illustrating my apparatus, A A indicate the vessels of the battery, suitably supported in position upon a stand or platform, A', having a trough, A², for leading or conducting the thick juice to the factory for subsequent treatment.

The vessels A are each provided with a filling-aperture, having a cover, a, screwed down into position thereon, a sieve or filter, a', inclined toward the front side of the vessel, and a door, a², located at the discharge end of the sieve. The door a² is connected to a lever, b, articulated to the vessel, and having a rod, $b'$, pivoted to the opposite side of the door-opening, passed through its free end. Upon the screw-threaded end of the rod $b'$ is fitted a hand-lever, $b^2$. The aforesaid arrangement applied to the door effects the holding of the same as against inward pressure.

A cock, $c$, permits the drawing off of the unfiltered juice into the trough $A^2$. The door $a^2$ permits the removal of the refuse material from the vessel.

B is a water-pipe, which leads the water from an elevated tank or under pressure.

C is a pipe for running the juice from the heater. D is a pipe for conducting thick juice from extractor, and E E are pipes connecting the aforesaid pipes with the vessels A.

Series of valves, $d\ e\ f$, are supplied to the several pipes B C D to control the operation of the fluids or liquids in the said pipes, as may be desired.

F is a pipe connecting the bottom of one vessel with the top of the adjoining vessel, and F' is a similar pipe connecting the bottom of the middle vessel with the top of the one adjoining it on the left, and they serve to pass the filtered juice back into the extractors or vessels A, to repeat the operation when desired.

G is the calorifiant, arranged with relation to the other parts of the apparatus as shown in Fig. 3.

One advantage derived from my process is that the employment of hermetically-closed batteries prevents ingress of air, which causes decomposition of the tannic acid, the same becoming through its effects gallic and ellagic acid.

Another advantage is that, unlike other processes, I make direct application of steam from a heating apparatus, one such device being located between each pair of extractors. It follows that not only is a great economy of time effected in performing the operation, but that a much greater product is thus obtained from the same quantity of material, the increased production being estimated at not less than forty per centum.

I claim and desire to secure by Letters Patent—

The tank A, having the inclined screen $a'$ arranged a short distance above its bottom, and the door $a^2$, having the lever $b$ fulcrumed at its center, and adjustable by the handle $b^2$, nut, and screw $b'$, in combination with the arrangement of pipes E, D, C, B, and F and their cocks, substantially as and for the purpose set forth.

In testimony whereof I affix my signature in presence of two witnesses.

OTTO KOHLRAUSCH.

Witnesses:
VICTOR KARMIN,
 *Engineer.*
HANS KOTTASS.